United States Patent [19]

Hook et al.

[11] E Re. 29,122

[45] Reissued Jan. 25, 1977

[54] ROOT CROP HARVESTER

[75] Inventors: Richard Wayne Hook; Richard David Zaun, both of Des Moines, Iowa

[73] Assignee: Deere & Company, Moline, Ill.

[22] Filed: Sept. 5, 1975

[21] Appl. No.: 610,870

Related U.S. Patent Documents

Reissue of:

[64] Patent No.: 3,757,867
Issued: Sept. 11, 1973
Appl. No.: 229,669
Filed: Feb. 28, 1972

[52] U.S. Cl. ..... 171/58; 56/345; 198/589; 214/520

[51] Int. Cl.[2] ..... A01D 17/02

[58] Field of Search ..... 171/58, 138, 144; 198/101, 126, 104; 56/345; 214/520

[56] References Cited

UNITED STATES PATENTS

| | | | |
|---|---|---|---|
| 2,392,697 | 1/1946 | Russell et al. | 198/101 |
| 2,503,129 | 4/1950 | Pautz | 214/520 |
| 2,972,383 | 2/1961 | Erdman | 171/58 |

*Primary Examiner*—Russell R. Kinsey

[57] ABSTRACT

A root crop harvester includes a main frame, a plurality of digger wheels on the front of the main frame, conveyor means supported on the main frame to receive roots from the digger wheels and deliver the same to a transversely extending auger conveyor which moves the roots to a vertical [auger] conveyor. An additional conveyor mounted on the upper end of the vertical [auger] conveyor in root-receiving relationship therewith moves the roots laterally upwardly for deposit in a vehicle moving alongside the harvester. The additional conveyor is mounted for lateral movement [on] *at* the upper end of the vertical [auger] conveyor so that it can be moved inwardly to a transport position.

17 Claims, 3 Drawing Figures

ROOT CROP HARVESTER

Matter enclosed in heavy brackets [ ] appears in the original patent but forms no part of this reissue specification; matter printed in italics indicates the additions made by reissue.

CROSS REFERENCE TO RELATED APPLICATIONS

This application *is a reissue of U.S. Letters Patent No. 3,757,867, filed Feb. 28, 1972, and* discloses subject matter common to copending U.S. [ application ] *applications* Ser. Nos. 209,116; 209,117; 209,123; and 209,124; *now respectively U.S. Pat. Nos. 3,757,928, issued Sept. 11, 1973, 3,802,019, issued Apr. 9, 1974; 3,695,360 issued Oct. 3, 1972, and Re. 28,448, issued June 10, 1975*, all filed Dec. 17, 1971.

BACKGROUND OF THE INVENTION

The present invention relates generally to agricultural harvesting equipment and more particularly relates to harvesters for root crops such as sugar beets. In the following Background of the Invention and Description of the Preferred Embodiment, the root crop harvester will be described as a sugar beet harvester, but it should be understood that reference is made to sugar beets only for the purpose of providing a specific disclosure and not for limiting the invention.

Beet harvesters have remained basically unchanged for many years and have relied primarily upon chain conveyors or potato chains to elevate the beets from the digger wheels to a truck or trailer running alongside the harvester or to a tank on the harvester for subsequent delivery to the truck or trailer. In order to deliver the beets to a truck or trailer running alongside the harvester, it is necessary that a conveyor extend outwardly to a position over truck or trailer. This outwardly projecting conveyor increased the width of the harvester to such an extent that it was very difficult to transport the harvester through gateways or on public roads. Also, because of the pure bulk and numerous parts of potato chains, it has been a difficult and involved process to reduce the width of the harvester for transport.

In the aforementioned copending U.S. applications, there is disclosed and claimed various aspects of a beet harvester which eliminates many of the potato chains, but it still has an upper conveyor which extends laterally outwardly for the deposit of beets into a truck or trailer moving alongside the harvester.

SUMMARY OF THE INVENTION

The principal object of the present invention is to provide a beet harvester, the width of which is easily reduced for transportation.

A more specific object of the present invention is to provide a beet harvester which elevates the beets with a generally upright auger conveyor, which has a laterally outwardly extending conveyor at the upper end of the auger conveyor to deliver the beets to an outer deposit area, and in which the upper conveyor is adjustably mounted on the auger conveyor for movement inwardly to a transport position.

Another object of the present invention is to provide a beet harvester in which the beets are moved to an elevated position by a generally upright auger conveyor and in which the beets are moved laterally outwardly for deposit in a truck or trailer by an elongated, generally horizontal and transversely extending [ auger ] conveyor which is mounted on the upper end of the auger conveyor for movement between a normal working position and a transport position, and in which means are provided to lock the upper conveyor in either one of its alternate positions.

The above objects and additional objects and advantages of the present invention will become apparent, along with the details of construction of a preferred embodiment of the invention, to those skilled in the art from a reading of the following detailed description when taken in conjunction with the accompanying drawings.

DESCRIPTION OF THE PREFERRED EMBODIMENT

Figure 1:
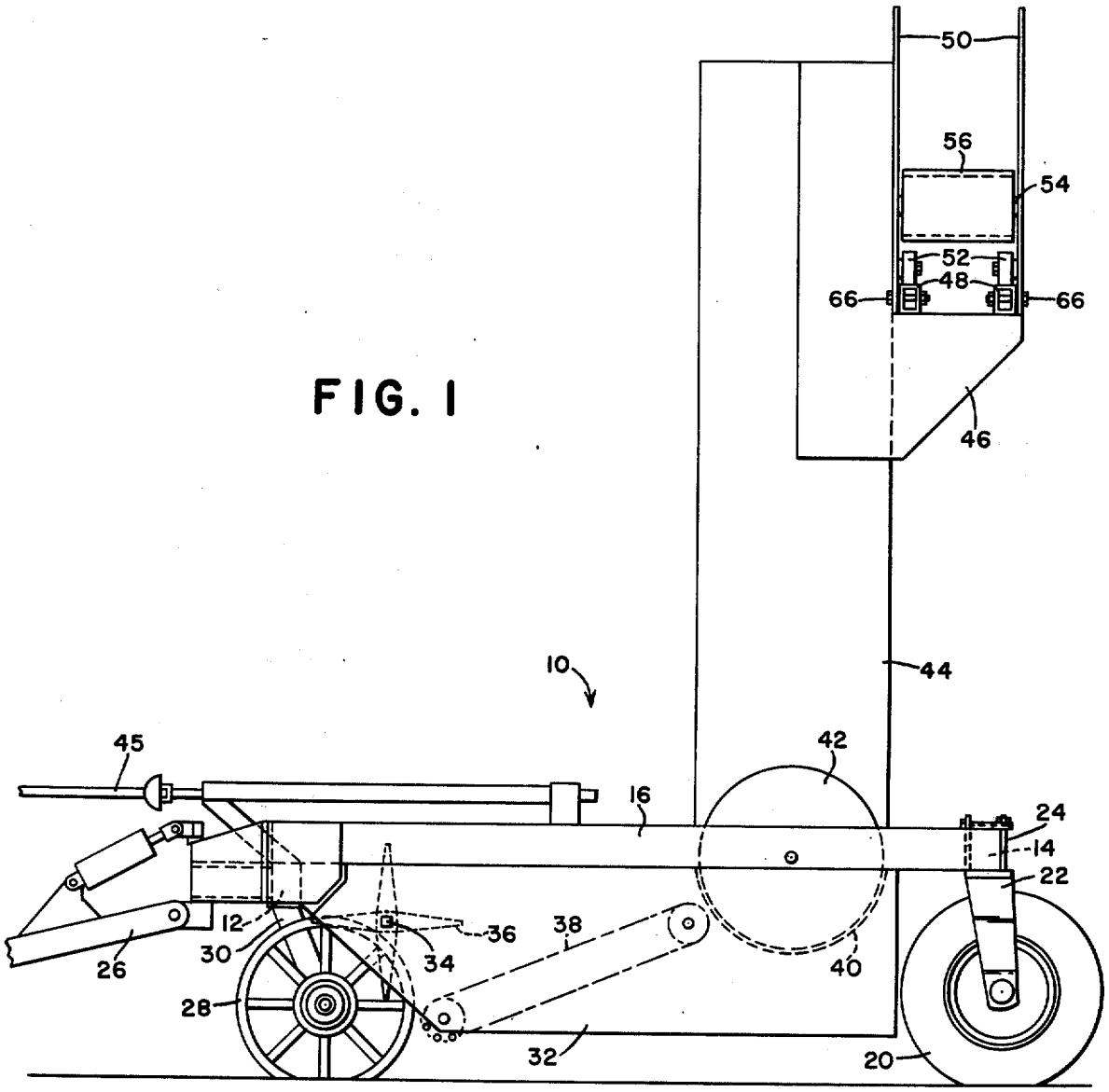
FIG. 1 is a side elevational view of a beet harvester according to the present invention.

The beet harvester illustrated in the drawings and indicated generally by the numeral 10 includes a main frame having a front frame member 12, a rear frame member 14, a left side frame member 16 and a right side frame member 18. The rear of the main frame is supported by a pair of wheels 20 journaled to the lower end of the fork members 22 which have their upper ends secured to the rear frame member 14 by clamps 24.

The forward end of the main frame is supported by a hitch 26 which is adapted to have its forward end connected to a tractor drawbar. A full description of the main frame and hitch can be had by referring to the aforementioned copending U.S. applications.

A plurality of digger wheels 28 are secured to and depend from the front frame member 12 by a plurality of standards 30. A support plate 32 is secured to and depends from each side of the main frame and at their forward ends support a cross shaft 34 on which a plurality of ejector paddles 36 are mounted. A conveyor chain 38 is supported by the plate 32 directly behind the digger wheels 28 to receive beets therefrom and deliver the same upwardly and rearwardly to a trough 40 which extends transversely across the rear end of the conveyor chain. An auger 42 journaled in the trough 40 moves the beets deposited therein laterally to one end where the beets are deposited in the lower end of a generally upright auger conveyor having a housing 44. The ejector paddles, conveyor chain, auger and auger conveyor are all driven by the tractor through a main power shaft 45. For the full details of construction of the various components referred to and the manner in which they are driven, reference should be had to the aforementioned copending U.S. applications.

Figure 2:
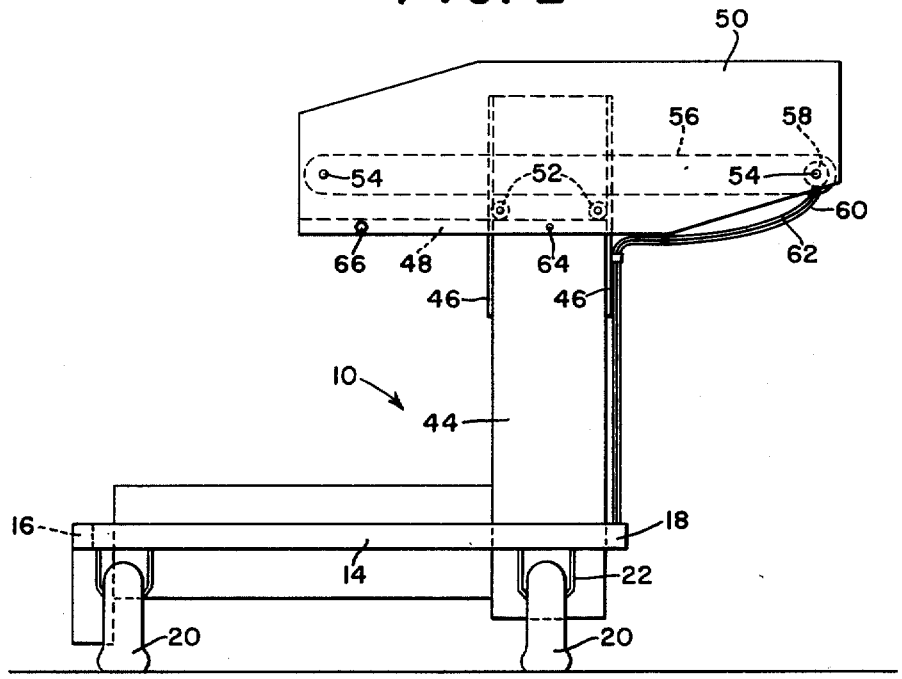
FIG. 2 is a rear elevational view of the beet harvester illustrated in FIG. 1, illustrating the upper transverse conveyor in its normal working position; and, FIG. 3 is a view similar to FIG. 2 but illustrating the upper transverse conveyor in its transport position.
Figure 3:
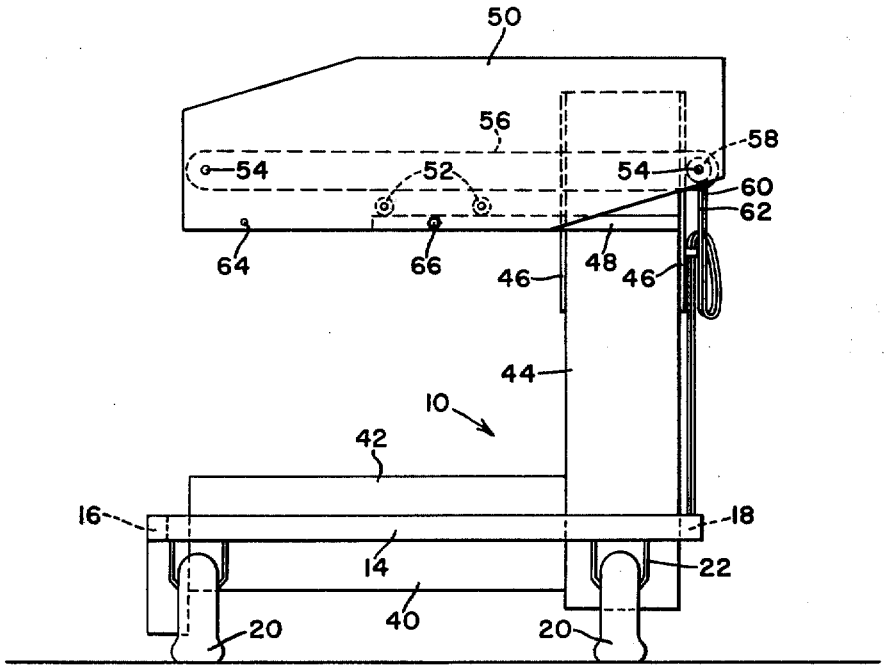

A pair of gussett plates 46 secured to the sides of the upright auger conveyor housing 44 extend rearwardly therefrom and support a pair of spaced, elongated, and transversely extending beams or rails 48 which are rigidly secured thereto. As can be seen in FIGS. 2 and 3, the beams 48 extend transversely inwardly from the vertical auger conveyor housing to overlie a portion of the area directly behind the trough 40 and auger 42. An upper conveyor supported on the rails 48 includes a pair of elongated transversely extending and fore-and-aft spaced side walls or plates 50 which have their lower portions positioned alongside the outer faces of the rails 48. A pair of spaced rollers 52 mounted on the inner face of each of the side walls 50 support the side walls 50 on the rails 48. A pair of guide rolls 54 are journaled between the opposite ends of the side walls 50 and an endless flexible belt or chain 56 is trained about the guide rollers 54. The guide roller 54 also serve to interconnect the side walls 50, and additional interconnecting members can be provided between the side walls below the belt or chain 56 to provide a more rigid interconnection. A hydraulic motor 58 is mounted on the forwardmost side wall and connected to the guide roller on the outer end of the upper conveyor to provide the power to drive the upper conveyor. A pair of hydraulic lines 60 and 62 extend from the hydraulic motor 58, down along the housing 44 of the upright auger conveyor, and forwardly for connection with the conventional tractor hydraulic system.

The rollers 52 on the rails 48 provide for easy movement of the upper conveyor between a normal working position illustrated in FIG. 2 and a transport position illustrated in FIG. 3. The lower portions of the side walls 50 guide the rollers on the rails 48. Near their inner ends the rails 48 are provided with apertures and each of the side walls 50 is provided with a pair of similar apertures 64 which are positioned near the inner ends of the side walls and at a position between and below the rollers 52. Pins or bolts 66 inserted through the apertures in the side walls and the apertures in the rails selectively and releasably lock the upper conveyor in either its normal working position or its transport position.

For operation, the upper conveyor will be moved to the position illustrated in FIG. 2 and the pins 66 will be inserted through the aperture at the inner ends of the side walls 50. The conveyor belt 56 will be driven in a clockwise direction as viewed in FIGS. 2 and 3 so that beets delivered thereto by the upright auger conveyor will be moved outwardly for deposit in a truck or trailer moving alongside the harvester. By reversing the direction of fluid to the hydraulic motor 58, the conveyor belt 56 can also be driven in a counterclockwise direction for the delivery of beets to a tank attachment as illustrated, described and claimed in the aforementioned copending U.S. application Ser. No. 209,123.

The harvester as illustrated in FIG. 2 is too wide for transport on public roads and must be narrowed for transport. This is accomplished by removing the pins 66 and rolling the upper conveyor inwardly to the position illustrated in FIG. 3 wherein the outermost end of the upper conveyor is positioned substantially to the rear of the upright auger conveyor. The pins 66 are then inserted through the aperture provided between the rollers 52 so that the upper conveyor is locked in its transport position.

From the foregoing it can be seen that the present invention provides a beet harvester which can easily be narrowed for transport through restricted areas and on public roads.

Although only a single preferred embodiment of the invention has been described and illustrated, various modifications within the spirit and scope of the invention will become apparent to those skilled in the art and can be made without departing from the underlying principles of the invention.

We claim:

1. A root crop harvesting implement including a main frame, root digging means secured across the forward end of the main frame, a generally upright auger conveyor mounted on the main frame rearwardly of the root digging means, conveyor means supported on the main frame for receiving roots from the root digging means and delivering the same to a lower root-receiving area in the auger conveyor, and a lateral conveyor mounted on the upper end of the auger conveyor in root-receiving relationship therewith and normally extending laterally outwardly to one side of the main frame to deliver roots to an outer deposit area, characterized in that the lateral conveyor is mounted on the auger conveyor for selective lateral movement inwardly from its normal position in which it extends laterally outwardly to one side of the main frame to a transport position in which its opposite ends are in generally vertical alignment with the sides of the main frame whereby the implement can be narrowed for transport.

2. A harvesting implement as set forth in claim 1 wherein a pair of fore-and-aft spaced rails are supported on the auger conveyor, the lateral conveyor is provided with support wheels movable along the rails, and means are provided to releasably lock the lateral conveyor in either the normal position or the transport position.

3. A harvesting implement as set forth in claim 2 wherein the lateral conveyor includes a pair of fore-and-aft spaced and laterally extending frame plates, a plurality of rotatable guide means are journaled between the plates above the lower edge thereof, an endless flexible root moving means is trained about the guide means, the support wheels are mounted on the inner faces of the plates above the lower edge thereof and below the lower flight of the endless flexible means, the lower edges of the plates extend downwardly *alongside* the outside faces of the rails to guide the wheels on the rails.

4. A harvesting implement as set forth in claim 3 wherein the means to releasably lock the lateral conveyor in either of its alternate positions includes pin means insertable through corresponding apertures provided in the plates and rails.

5. A harvesting implement as set forth in claim 1 wherein a pair of fore-and-aft spaced conveyor support rails are supported at the upper end of the auger conveyor, the lateral conveyor includes a pair of fore-and-aft spaced laterally elongated frame plates having lower portions positioned alongside the outer surfaces of the rails, support members secured to the inner faces of the plates in engagement with the upper surfaces of the rails to support the lateral conveyor thereon, rotatable guide means journaled between the plates at the opposite ends thereof, an endless flexible root conveying element trained about the guide means, and means acting between the rails and plates to releasably lock the lateral conveyor in alternate positions on the rails.

6. A root crop harvesting implement including forward root digging means, first conveyor means rearwardly of the root digging means for receiving roots from the root digging means and conveying the same upwardly and rearwardly, second conveyor means for receiving roots from the first conveyor means and moving the same laterally, a generally upright auger conveyor at one end of the second conveyor means for receiving roots therefrom and elevating the roots, third conveyor means carried at the upper end of the auger conveyor in root-receiving relationship therewith and extending laterally outwardly therefrom to move roots to an outer deposit area at the outer end of the third conveyor means remote from the auger conveyor, the third conveyor means being mounted on the auger conveyor for lateral movement inwardly to a transport position in which its outer end is closely adjacent the auger conveyor, and means acting between the third conveyor means and the auger conveyor to releasably lock the third conveyor means in either its normal operating position or its transport position.

7. A harvesting implement as set forth in claim 6 wherein a pair of fore-and-aft spaced and laterally extending support rails are secured to the upper end of the auger conveyor and the third conveyor means is provided with a plurality of support rollers movable along the support rails to facilitate lateral movement of the third conveyor means.

8. A root crop harvester comprising: a main frame having transversely extending front and rear frame members; wheel means secured to and supporting the rear of the main frame; hitch means secured to a forward portion of the main frame and adapted to be connected to a propelling tractor for at least partially supporting the front of the main frame; root digging means secured to and depending from the front frame member; first conveyor means supported from the main frame behind the root digging means for receiving roots therefrom and moving the same upwardly and rearwardly; trough means supported from the main frame and extending transversely across the rear of the first conveyor means in root-receiving relationship thereto; an auger journaled in the trough means for moving roots deposited therein to one end thereof; a generally vertical auger conveyor means supported on the main frame with its lower end in root-receiving relationship with the one end of the trough means; drive means for the first conveyor, the auger and the auger conveyor supported on the main frame and including a main drive shaft extending generally forwardly along the hitch means for connection with the tractor; an elongated, generally horizontal and transversely extending upper conveyor mounted on the upper end of the auger conveyor in root-receiving relationship thereto; the upper conveyor being mounted for transverse movement between a normal working position in which it is substantially centered with respect to the auger conveyor and a transport position in which its outer end is in close proximity to the auger conveyor; means acting between the auger conveyor and upper conveyor to releasably secure the upper conveyor in either its working or transport position; and reversible drive means for the upper conveyor.

9. A harvester as set forth in claim 8 wherein a pair of fore-and-aft spaced rails are supported at the upper end of the auger conveyor and to the rear thereof, the rails extend inwardly from the auger conveyor to overlie the area to the rear of the trough means, and the upper conveyor is supported on the rails by a plurality of rollers secured to an intermediate portion of the upper conveyor and movable along the rails from one end thereof to the other.

10. A harvesting implement as set forth in claim 9 wherein the upper conveyor includes a pair of fore-and-aft spaced side walls having lower portions positioned alongside the outer faces of the rails, and the rollers are mounted on the inner faces of the plates.

*11. A root crop harvesting implement including a main frame, root digging means secured across the forward end of the main frame, a generally upright conveyor means for elevating roots mounted on the main frame rearwardly of the root digging means, conveyor means supported on the main frame for receiving roots from the root digging means and delivering the same to a lower root receiving area adjacent the upright elevating conveyor means, and a lateral conveyor mounted adjacent the upper portion of the elevating conveyor means in root receiving relationship therewith and normally extending laterally outwardly to one side of the main frame to deliver roots to an outer deposit area, characterized in that the lateral conveyor is mounted adjacent the elevating conveyor means for selective lateral movement inwardly from its normal position in which it extends laterally outwardly to one side of the main frame to a transport position in which its opposite ends are in generally vertical alignment with the sides of the main frame whereby the implement can be narrowed for transport.*

*12. A harvesting implement as set forth in claim 11 wherein a pair of fore-and-aft spaced rails are supported on the main frame adjacent the upright elevating conveyor means, the lateral conveyor is provided with support wheels movable along the rails, and means are provided to releasably lock the lateral conveyor in either the normal position or the transport position.*

*13. A harvesting implement as set forth in claim 12 wherein the lateral conveyor includes a pair of fore-and-aft spaced and laterally extending frame plates, a plurality of rotatable guide means are journaled between the plates above the lower edge thereof, an endless flexible root moving means is trained about the guide means, the support wheels are mounted on the inner faces of the plates above the lower edge thereof and below the lower flight of the endless flexible means, the lower edges of the plates extend downwardly alongside the outside faces of the rails to guide the wheels on the rails.*

*14. A harvesting implement as set forth in claim 13 wherein the means to releasably lock the lateral conveyor in either of its alternate position includes pin means insertable through corresponding apertures provided in the plates and rails.*

*15. A harvesting implement as set forth in claim 11 wherein a pair of fore-and-aft spaced conveyor support rails are supported on the main frame adjacent the upper portion of the upright elevating conveyor means, the lateral conveyor includes a pair of fore-and-aft spaced and laterally elongated frame plates having lower portions positioned alongside the outer surfaces of the rails, support members secured to the inner faces of the plates in engagement with the upper surfaces of the rails to support the lateral conveyor thereon, rotatable guide means journaled between the plates at the opposite ends thereof, an endless flexible root conveying element trained about the guide means, and means acting between the rails and plates to releasably lock the lateral conveyor in alternate positions on the rails.*

*16. A root crop harvesting implement including forward root digging means, first conveyor means rearwardly of the root digging means for receiving roots from the root digging means and conveying the same upwardly and rearwardly, a second conveyor means for receiving roots from the first conveyor means and moving the same laterally, a generally upright elevating conveyor means at one end of the second conveyor means for receiving*

*roots therefrom and elevating the roots, third conveyor means carried adjacent the upper portion of the upright elevating conveyor means in root receiving relationship therewith and extending laterally outwardly therefrom to move roots to an outer deposit area at the outer end of the third conveyor means remote from the elevating conveyor means, the third conveyor means being mounted adjacent the elevating conveyor means for lateral movement inwardly to a transport position in which its outer end is closely adjacent the elevating conveyor means, and means acting between the third conveyor means and the elevating conveyor means to releasably lock the third conveyor means in either its normal operating position or its transport position.*

*17. A harvesting implement as set forth in claim 16 wherein a pair of fore-and-aft spaced and laterally extending support rails are secured adjacent the upper portion of the elevating conveyor means and the third conveyor means is provided with a plurality of support rollers movable along the support rails to facilitate lateral movement of the third conveyor means.*

* * * * *